(12) United States Patent
Schneider et al.

(10) Patent No.: US 6,412,464 B1
(45) Date of Patent: Jul. 2, 2002

(54) CHAIN GUIDE FOR A CONTROL-SHAFT DRIVE OF AN INTERNAL-COMBUSTION ENGINE AND METHOD OF PRODUCING A CHAIN GUIDE

(75) Inventors: Andreas Schneider, Leonberg; Volker Diehm, Schwaigern, both of (DE)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 09/710,772

(22) Filed: Nov. 10, 2000

(30) Foreign Application Priority Data

Nov. 12, 1999 (DE) .......................... 199 54 481

(51) Int. Cl.⁷ .................................................. F01L 1/02
(52) U.S. Cl. ............................... 123/90.31; 123/90.15; 123/90.17; 123/90.27
(58) Field of Search .................... 123/90.31, 90.15, 123/90.17, 90.27, 193.5, 196 AB, 192.2, 198 DA, 572; 474/111, 140

(56) References Cited

U.S. PATENT DOCUMENTS

| | | | |
|---|---|---|---|
| 3,358,522 A | | 12/1967 | Poyser et al. |
| 4,480,603 A | | 11/1984 | Tsuboi |
| 4,530,681 A | | 7/1985 | Kurata et al. |
| 4,583,962 A | | 4/1986 | Bytzek et al. |
| 4,589,382 A | * | 5/1986 | Tsuboi ..................... 123/90.31 |
| 4,607,601 A | | 8/1986 | Kohler |
| 4,633,826 A | * | 1/1987 | Tominaga et al. ....... 123/90.31 |
| 4,713,045 A | | 12/1987 | Kodama et al. |
| 4,716,864 A | | 1/1988 | Binder |
| 4,825,818 A | | 5/1989 | Hamamura et al. |
| 4,832,664 A | | 5/1989 | Groger et al. |
| 4,889,087 A | | 12/1989 | Bergsten |
| 4,951,616 A | | 8/1990 | Aruga et al. |
| 4,957,077 A | | 9/1990 | Okitsu et al. |
| 4,974,560 A | | 12/1990 | King |
| 5,002,023 A | | 3/1991 | Butterfield et al. |
| 5,088,457 A | | 2/1992 | Ferrazzi |
| 5,092,292 A | * | 3/1992 | Iguchi et al. ......... 123/196 AB |

(List continued on next page.)

FOREIGN PATENT DOCUMENTS

| | | |
|---|---|---|
| DE | 196 06 002 | 1/1998 |
| DE | 197 14 763 | 7/1998 |
| DE | 297 00 735 | 7/1998 |
| DE | 197 04 899 | 10/1998 |
| EP | 823 543 | 2/1998 |
| FR | 2658-560 | 2/1991 |
| JP | 56 118508 | 9/1981 |
| JP | 59-70820 | 4/1984 |
| JP | 60 104843 | 6/1985 |
| JP | 3-15608 | 1/1991 |
| JP | 02 296046 | 12/1991 |

OTHER PUBLICATIONS

Friedrich Viehweg and Sohn Verlasgellschaft mbH, Das Shell Lexikon Verbrennugsmotor, Folge 49: ATZ und MTZ, Heft 9, 1999. (See Stmt. of Relevance).

*Primary Examiner*—Teresa Walberg
*Assistant Examiner*—Fadi H. Dahbour
(74) *Attorney, Agent, or Firm*—Michael Best & Friedrich LLP

(57) ABSTRACT

This invention relates to a chain guide rail for an internal-combustion engine, having a body portion and a pin, both made with a first material, an overmolding of a second material which covers both the pin and the body portion, and a longitudinal axis through the length of the guide rail. The pin, inserted into a housing recess in the internal-combustion engine, is restrained from moving perpendicular to the first longitudinal axis but is free to move parallel to the axis. Preferred embodiments of the present invention utilize a fastener to hold the guide rail to the housing. Preferred embodiments also utilize raised portions spaced along the guide rail which reduce the longitudinal shrinkage during cooling of the second material.

12 Claims, 3 Drawing Sheets

U.S. PATENT DOCUMENTS

| | | | |
|---|---|---|---|
| 5,109,813 A | 5/1992 | Trzmiel et al. | |
| 5,117,786 A | 6/1992 | Trzmiel et al. | |
| 5,144,920 A | 9/1992 | Imperial | |
| 5,152,261 A | 10/1992 | Butterfield | |
| 5,152,262 A | 10/1992 | Parker | |
| 5,154,144 A | 10/1992 | Okui et al. | |
| 5,184,581 A | 2/1993 | Aoyama et al. | |
| 5,190,502 A | 3/1993 | Gardner et al. | |
| 5,199,395 A * | 4/1993 | Mizumura et al. | 123/196 AB |
| 5,216,984 A | 6/1993 | Shimano et al. | |
| 5,266,066 A | 11/1993 | White | |
| 5,297,508 A | 3/1994 | Clarke et al. | |
| 5,333,578 A * | 8/1994 | Shimura et al. | 123/90.17 |
| 5,366,418 A | 11/1994 | Fukushima et al. | |
| 5,367,992 A | 11/1994 | Butterfield et al. | |
| 5,370,586 A | 12/1994 | Thomsen et al. | |
| 5,400,748 A | 3/1995 | Batzill et al. | |
| 5,489,243 A | 2/1996 | Watanabe | |
| 5,647,812 A | 7/1997 | McDonald et al. | |
| 5,653,652 A | 8/1997 | Simpson | |
| 5,690,084 A * | 11/1997 | Gunji et al. | 123/572 |
| 5,740,773 A * | 4/1998 | Ohshige | 123/198 DA |
| 5,899,181 A | 5/1999 | Kurata et al. | |
| 6,112,712 A * | 9/2000 | Safarik et al. | 123/90.31 |
| 6,240,887 B1 * | 6/2001 | Tosaka et al. | 123/90.31 |
| 6,250,268 B1 * | 6/2001 | Iwase et al. | 123/90.31 |
| 6,302,077 B1 * | 10/2001 | Safarik et al. | 123/192.2 |
| 6,318,321 B1 * | 11/2001 | Kensok et al. | 123/90.31 |

* cited by examiner

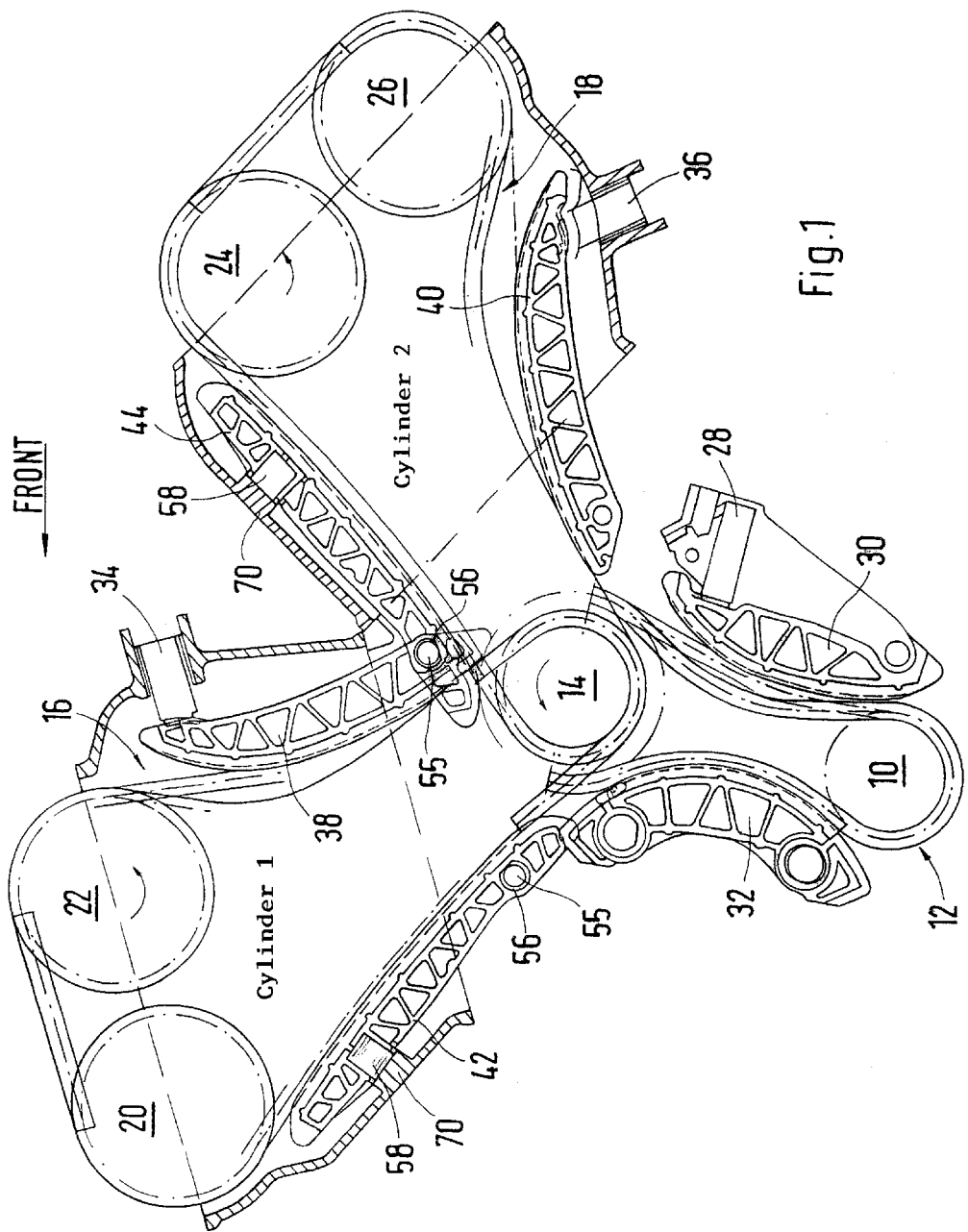

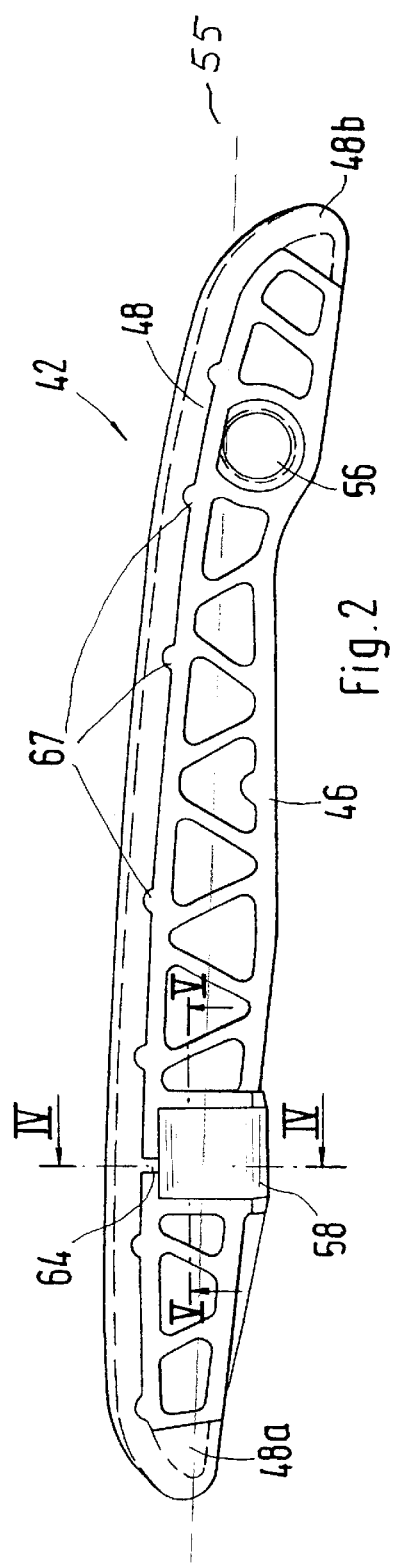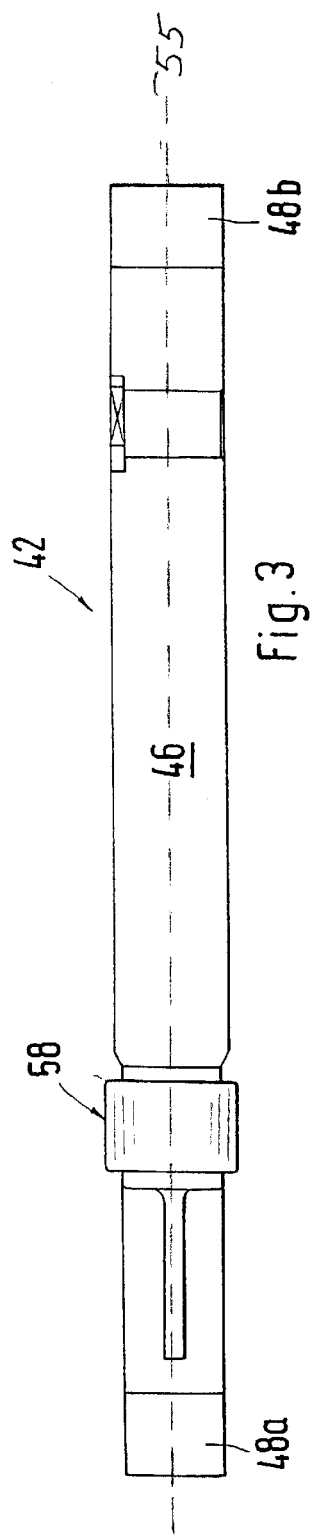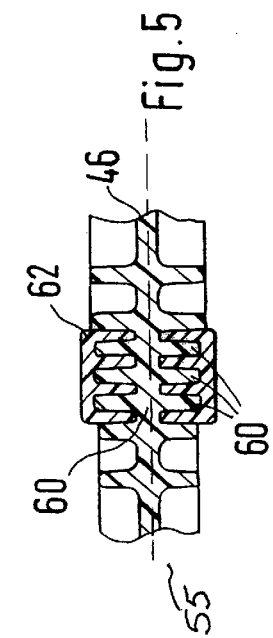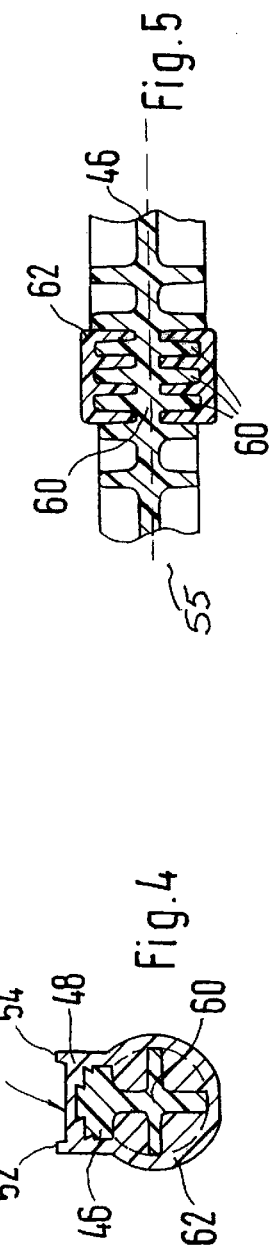

CHAIN GUIDE FOR A CONTROL-SHAFT DRIVE OF AN INTERNAL-COMBUSTION ENGINE AND METHOD OF PRODUCING A CHAIN GUIDE

The invention is based upon a chain guide for a control-shaft drive of an internal-combustion engine and upon a method of producing a chain guide. Chain guides for control-shaft drives of internal-combustion engines are known (see for example U.S. Pat. No. 4,832,664 issued to Gröger, et al.), in which two bearing lugs are provided in the jaw-shaped chain guide in order to retain the chain guide. Gröger discloses using two different materials in construction of chain guides. In particular, Gröger discloses using a plastic material such as polyamide for the main body portion and a more wear-resistant material such as polyamide with fiberglass additions for the slide lining portion. In this case the bearing pins engaged in the bearing lugs are mounted on a housing part of the internal-combustion engine and hold the chain drive in the desired position with respect to the control chain. Because of the limited space inside the control-chain housing of an internal-combustion engine it can be extremely difficult in some cases to fasten chain guides of this type since the accessibility of the fastening points is restricted.

The present invention therefore provides a secure fastening for the chain guide in the control-chain housing, which at the same time permits a simple assembly and dismantling of the chain guide.

The chain guide can be fixed in a simple and secure manner in the control-chain housing with the aid of the pin provided on the main body of the chain guide, as the pin of the chain guide engages with positive locking in a recess—suitably adapted to the contour of the pin—in the control-chain housing of the internal-combustion engine. During the assembly of the chain drive or the control-shaft drive, the chain guide can be inserted in a simple manner—with its end facing the pin first—between the control chain and the housing from below, i.e. from the crank space, until the pin engages in the recess and is securely fixed by a bearing pin with the aid of the bearing lug provided at the other end of the chain guide. It is also possible for the chain guide to be fastened to the bearing lug thereof before the cylinder-head housing has been assembled, in order to place the cylinder head on the cylinder subsequently, so that the pin can again engage the recess.

The pin for the chain guide can be produced according to the invention in that the covering of the pin is produced together with the slide-lining member for the chain guide in an injection-molding process. In this way, the wear-resistant lining can be applied to the main body and the wear-resistant covering for the pin can be produced in one operation.

An embodiment of the invention is illustrated in the drawing and is described in greater detail below. In the drawing FIG. 1 is a diagrammatic illustration of the control-shaft drive of an internal-combustion engine with a V-shaped arrangement of the cylinders;

FIG. 2 is a side view of a chain guide without a continuous flexible member;

FIG. 3 is a plan view of the chain guide;

FIG. 4 is a section along the line IV—IV in FIG. 2;

FIG. 5 is a section along the line V—V in FIG. 2; and

Figure 6:
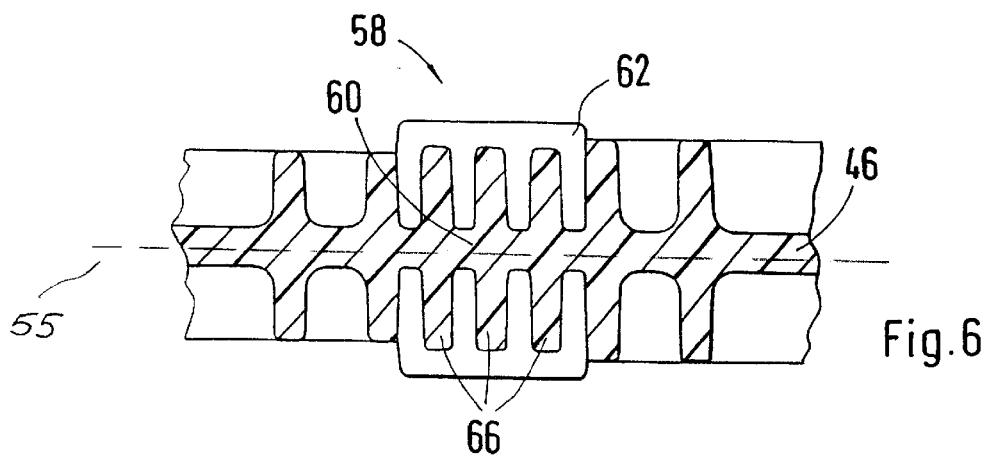
FIGS. 6 and 7 show an enlarged illustration of the sections corresponding to FIG. 4 and FIG. 5, the section through a bearing receiving recess being additionally illustrated in FIG. 7.

A chain wheel 10 mounted on a crankshaft drives, by way of a primary chain 12, a triple chain wheel 14 mounted on an intermediate shaft. The camshaft chain wheels 20 and 22 (cylinder 1) and 24 and 26 (cylinder 2) mounted in the cylinder-head housing are driven with the aid of two secondary chains 16 and 18 by way of the two smaller pinions, the chain wheels 20 and 24 driving the camshafts for the exhaust valves and the chain wheels 22 and 26 driving the camshafts for the intake valves. The primary chain 12 is provided on its loose run with a tensioning rail 30, which is acted upon by an hydraulic tensioning means 28 and which also performs a chain-guiding function, and on its loaded run with a chain guide which is referred to below as the guide rail 32.

The two secondary chains 16 and 18 are likewise provided on their loose run with tensioning rails 38 and 40 acted upon by hydraulic tensioning means 34 and 36 and on their loaded run with rigidly fixed guide rails 42 and 44. The primary chain 12 and the two secondary chains 16 and 18 are continuous flexible members, and alternatively could be belts or any other similar continuous flexible member 5.

Figure 7:
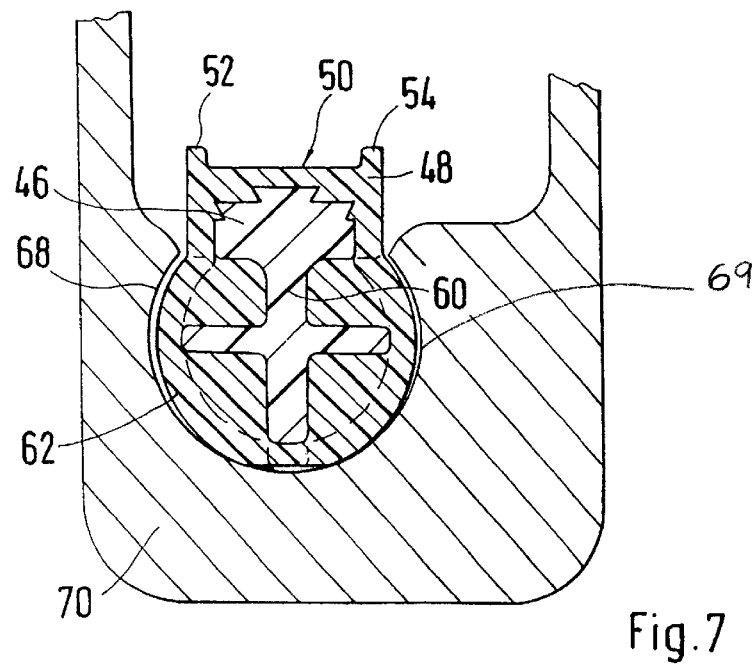

The guide rail 42 illustrated in greater detail in FIGS. 3 to 7 (guide rail 44 is designed identically thereto) comprises a main body 46 and a slide lining member 48, of which the slide path 50 for the secondary chain 16 is bounded by two webs 52 and 54 arranged laterally along the slide path 50. The guide rail 42 has a longitudinal axis 55.

The guide rail 42 designed in the form of a jaw is provided at one end thereof with a bearing lug 56 arranged in the main body 46 and at the other end with a cylindrical pin 58, which are both used for fastening the guide rail 42, as will be explained in greater detail below. The pin 58 is substantially coaxial with the longitudinal axis 55 and comprises a core 60, which is formed by the main body 46 of the guide rail 42 and which is surrounded by a covering 62. The core 60 and the covering 62 consist of two different plastic materials, the covering 62 being produced together with the slide lining member 48 in the injection-molding process. The plastic material for the slide lining member 48 is applied to the main body 46 which is provided with a dovetail guide. Two fastening webs 64, one of which is visible in FIG. 2, are arranged laterally in the main body 46 at the level of the pin 58. When the slide lining member 48 is applied, the plastic material flows over the two webs 64 around the core 60 and forms the outer surface of the pin 58 as the covering 62. Because of the honeycomb-shaped structure of the core 60, the plastic material, which is capable of flowing during the production of the pin 58, can penetrate between the webs 66 of the core 60, so as to produce a durable covering 62 or pin.

Semicircular raised portions 67, which are distributed at intervals over the entire length of the guide rail 42 and which reduce the longitudinal shrinkage for the slide path 50 occurring for the slide lining member 48 during the cooling of the plastics material, are formed on the two edge zones of the surface receiving the slide lining member 48. The fact that the slide lining member 48 is mounted on the main body 46 at its two front ends 48a and 48b beyond the slide path 50 represents a further step for reducing the longitudinal shrinkage of the slide path 50.

The two guide rails 42 and 44 illustrated in their end position in FIG. 1 engage with positive locking by their two pins 58 in a recess 68 defined by an inner wall 69 of the control-chain housing 70. The recess 68 is suitably adapted to the contour of the covering 62. The control-chain housing 70 is flange-mounted laterally on the cylinder-head housing or integrally joined thereto. During the assembly of the guide rails 42 and 44 the end provided with the pin 58 can be guided from below, i.e. from the crankcase in a direction substantially parallel to the longitudinal axis 55, between the secondary chains 16 and 18 along the inner wall 69 of the control-chain housing 70, until the pins 58 enter the recesses 68 and reach a position relative to one another in which the bearing lugs 56 situated at the other end of the guide rails 42 and 44 can be secured to the bearing pin 55. It is also possible to fasten the guide rails 42 and 44 before the cylinder-head housing has been assembled, in order to place the cylinder-head housing on the cylinder subsequently.

What is claimed is:

1. A motorcycle internal combustion engine comprising:
   a camshaft;
   a flexible member coupled to the camshaft;
   a housing surrounding a portion of the flexible member, the housing having an inner wall defining a recess therein;
   a guide rail for guiding the flexible member, the guide rail defining a longitudinal axis and having:
      a body portion of a first material;
      a lining portion of a second material; and
      a first mounting location defined by a pin positioned in the recess, the recess not restraining movement of the pin parallel to the longitudinal axis, the recess restraining movement of the pin perpendicular to the longitudinal axis.

2. A motorcycle engine as claimed in claim 1, wherein the guide rail further includes a second mounting location wherein the engine further comprises a fastener for coupling the guide rail to the housing at the second mounting location.

3. A motorcycle engine as claimed in claim 1, wherein the pin has a core made of the first material and a covering made of the second material, the covering forming a barrier between the housing and the body portion.

4. A motorcycle engine as claimed in claim 1, further comprising a plurality of raised portions spaced along the guide rail such that the raised portions reduce the longitudinal shrinkage of the lining portion during cooling of the second material.

5. A motorcycle engine as claimed in claim 1, wherein the body portion has a first end and a second end and the lining portion substantially covers the first and second ends.

6. A motorcycle internal combustion engine comprising:
   a camshaft;
   a flexible member coupled to the camshaft;
   a housing surrounding a portion of the flexible member, the housing having an inner wall defining a recess therein;
   a guide rail for guiding the flexible member, the guide rail having:
      a body portion of a first material;
      a lining portion of a second material, the lining portion defining a slide path in contact with the flexible member; and
      a first mounting location defined by a pin positioned in the recess, the pin having a core made of the first material and a covering made of the second material, the covering forming a barrier between the housing and the body portion.

7. A motorcycle engine as claimed in claim 6, wherein the guide rail further includes a second mounting location, wherein the engine further comprises a fastener for coupling the guide rail to the housing at the second mounting location.

8. A motorcycle engine as claimed in claim 6, further comprising a plurality of raised portions spaced along the guide rail such that the raised portions reduce the longitudinal shrinkage of the lining portion during cooling of the second material.

9. A motorcycle engine as claimed in claim 6, wherein the body portion has a first and a second end and the lining portion substantially covers the first and second ends.

10. A motorcycle engine as claimed in claim 6, wherein the covering of the second material is integral with the guide rail and wherein the covering coats the guide rail and the lining portion.

11. A method of attaching a guide rail to a motorcycle internal combustion engine, the engine having a camshaft, an endless flexible member coupled to the camshaft, and a housing partially enclosing the flexible member, the housing having an inner wall defining a recess therein, the method comprising:
   providing a guide rail for guiding the flexible member, the guide rail defining a longitudinal axis and having a body portion of a first material, a lining portion of a second material, and a mounting location defined by a pin;
   aligning the pin with the recess;
   sliding the pin into the recess in a direction substantially parallel to the longitudinal axis; and
   securing the guide rail to the housing.

12. The method of claim 11, wherein the guide rail has a recess, and wherein the method further comprises, aligning a fastener with the recess in the guide rail, and securing the fastener and the guide rail to the housing.

* * * * *